United States Patent [19]
Doddapaneni et al.

[11] Patent Number: 5,470,674
[45] Date of Patent: Nov. 28, 1995

[54] ELECTROLYTE SALTS FOR POWER SOURCES

[76] Inventors: Narayan Doddapaneni, 10516 Royal Birkdale, NE.; David Ingersoll, 5824 Mimosa Pl., NE., both of Albuquerque, N.M. 87111

[21] Appl. No.: 341,494

[22] Filed: Nov. 17, 1994

Related U.S. Application Data

[63] Continuation-in-part of Ser. No. 153,416, Nov. 15, 1993, Pat. No. 5,378,550.

[51] Int. Cl.$^6$ ............................. H01M 6/16; H01M 6/18
[52] U.S. Cl. ........................... 429/50; 429/192; 429/194; 429/198; 252/62.2
[58] Field of Search .................. 429/13, 33, 46, 429/188, 192, 194, 197, 198, 50; 252/62.2, 62.3 Q; 204/410, 414, 421

[56] References Cited

U.S. PATENT DOCUMENTS

| | | | |
|---|---|---|---|
| 3,948,681 | 4/1976 | Barger, Jr. et al. | 429/46 |
| 4,327,166 | 4/1982 | Leger | 429/194 |
| 4,622,276 | 11/1986 | Walsh | 429/46 |
| 5,237,031 | 8/1993 | Kubota et al. | 429/192 X |

OTHER PUBLICATIONS

Asada, Manabu, et al., "Conducting Polymer for Capacitor Application: Enhanced Diffusivity of Ions at Cross–Linked Polypyrrole with Multivalent Dopant," Eletrochem. Soc. Processings, vol. 93–23 (1993) (month not available).

Primary Examiner—Anthony Skapars
Attorney, Agent, or Firm—Jeffrey D. Myers

[57] ABSTRACT

Electrolyte salts for power sources comprising salts of phenyl polysulfonic acids and phenyl polyphosphonic acids. The preferred salts are alkali and alkaline earth metal salts, most preferably lithium salts.

12 Claims, 2 Drawing Sheets

ELECTROLYTE SALTS FOR POWER SOURCES

GOVERNMENT RIGHTS

The U.S. Government has rights to this invention pursuant to Contract No. DE-AC04-76DP00789 awarded by the U.S. Department of Energy.

CROSS-REFERENCE TO RELATED APPLICATIONS

This application is a continuation-in-part application of U.S. patent application Ser. No. 08/153,416, entitled "Novel Electrolytes for Power Sources", to Doddapaneni et al., filed on Nov. 15, 1993, now U.S. Pat. No. 5,378,550, the teachings of which are incorporated herein by reference.

BACKGROUND OF THE INVENTION

1. Field of the Invention (Technical Field)

The present invention relates to power source electrolytes, both nonaqueous liquid electrolytes and solid polymer electrolytes (SPEs).

2. Background Art

Conventional electrolyte salts commonly used in nonaqueous electrolytes have the high conductivities required for designing high power, rechargeable batteries for electric vehicle applications. Unfortunately, metallic lithium reacts with the nonaqueous electrolytes and electrolyte salts, and these unwanted reactions cause premature cell failure. During charge/discharge cycling, electrolyte decomposition takes place and the decomposition products appear to react with the polymer separator. Deterioration of the separator can also cause cell failure due to internal shorts.

The most advanced rechargeable lithium batteries employ a negative electrode composed of either metallic lithium or a carbon intercalation compound and a positive electrode composed of an inorganic intercalation compound, and a liquid organic electrolyte. Energy densities greater than 100 Wh/kg have been achieved in small prototype cells with $Li_xCoO_2$, $Li_xNiO_2$, $Li_xMn_2O_4$, and $Li_xTiS_2$ positive electrodes. The drawbacks with these systems are safety, high cost, poor utilization of positive electrodes, poor lithium plating efficiency when metallic lithium is used, and hence poor cycle life and electrolyte decomposition during cell cycling. The power densities required for electric vehicle batteries may not be achievable with organic liquid electrolytes if the electrolytic decomposition results in electrode passivation.

Ionically conductive solid polymer electrolytes (SPEs) have been proposed to alleviate these problems. Significant research activities to produce highly conductive solid polymer electrolytes are being conducted throughout the world. The solid polymer electrolytes are electrical insulators, and therefore the use of a separator film is not needed. The common objective of the various investigations is to develop an SPE system that can be used in practical applications. Presently available liquid and SPEs are made with electrolyte salts dissolved in organic solvents, and, in the case of SPEs, immobilized in a polymer such as poly(ethylene oxide) (PEO) or poly(acrylonitrile) (PAN) polymers. The commonly used salts are $LiAsF_6$, $LiPF_6$, $LiClO_4$, $LiCF_3SO_3$, and the commonly used organic solvents are: ethylene carbonate, propylene carbonate, diethyl carbonate, dimethyl carbonate, γ-butyrolactone, dimethylformamide, etc. The electrolytes are unstable at lithium potentials; therefore, they undergo degradation on prolonged cycling, thus causing premature cell failure. In addition to the instability, because of the facile movement of both cations and anions of the electrolyte, unacceptable accumulation of these salts takes place at the electrode interphase on prolonged cycling or storage.

The present invention is of novel electrolyte salts for both organic liquid and solid polymer electrolytes that exhibit many beneficial properties, such as excellent thermal stability, good ionic conductivity, a wide electrochemical window, and ability to function with and without the use of an organic solvent, as described more fully below. The preferred electrolyte has a very large anion moiety, but the equivalent weight per lithium cation is smaller than hexafluoroarsenate or many other known electrolyte salts presently being used.

SUMMARY OF THE INVENTION (DISCLOSURE OF THE INVENTION)

The present invention is of a power source and method for providing power comprising: a solid polymer or a liquid; and an electrolyte salt, added to the solid polymer or liquid electrolyte, comprising a parent phenyl ring with bonds outside the parent phenyl ring to $R_1$, $R_2$, $R_3$, $R_4$, $R_5$, and $R_6$, where $R_1$, $R_2$, $R_3$, $R_4$, $R_5$, and $R_6$ each comprise a member selected from the group consisting of H, $SO_3X$, R'H, $R'SO_3X$, $PO_3X$, and $R'PO_3X$, where X comprises a cation and R' comprises an aliphatic chain, an aromatic ring system, or a combination of an aliphatic chain and an aromatic ring system. In the preferred embodiment, X comprises an alkali or alkaline earth metal cation, and most preferably a lithium ion.

A primary object of the present invention, whether used alone or in combination with other electrolytes, is to provide improved electrolytes for power sources.

An additional object of the present invention is to provide electrolytes having a wide electrochemical window in both solid polymer and other nonaqueous systems.

A primary advantage of the present invention, whether used alone or in combination with other electrolytes, is that the electrolytes of the invention provide excellent thermal stability to 350 degrees C. and higher.

Another advantage of the present invention, whether used alone or in combination with other electrolytes, is that the electrolytes of the invention have good ionic conductivity with excellent cation transference number, which will minimize interfacial film buildup.

Other objects, advantages and novel features, and further scope of applicability of the present invention will be set forth in part in the detailed description to follow, when taken in conjunction with the accompanying drawings, will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

Figure 1:
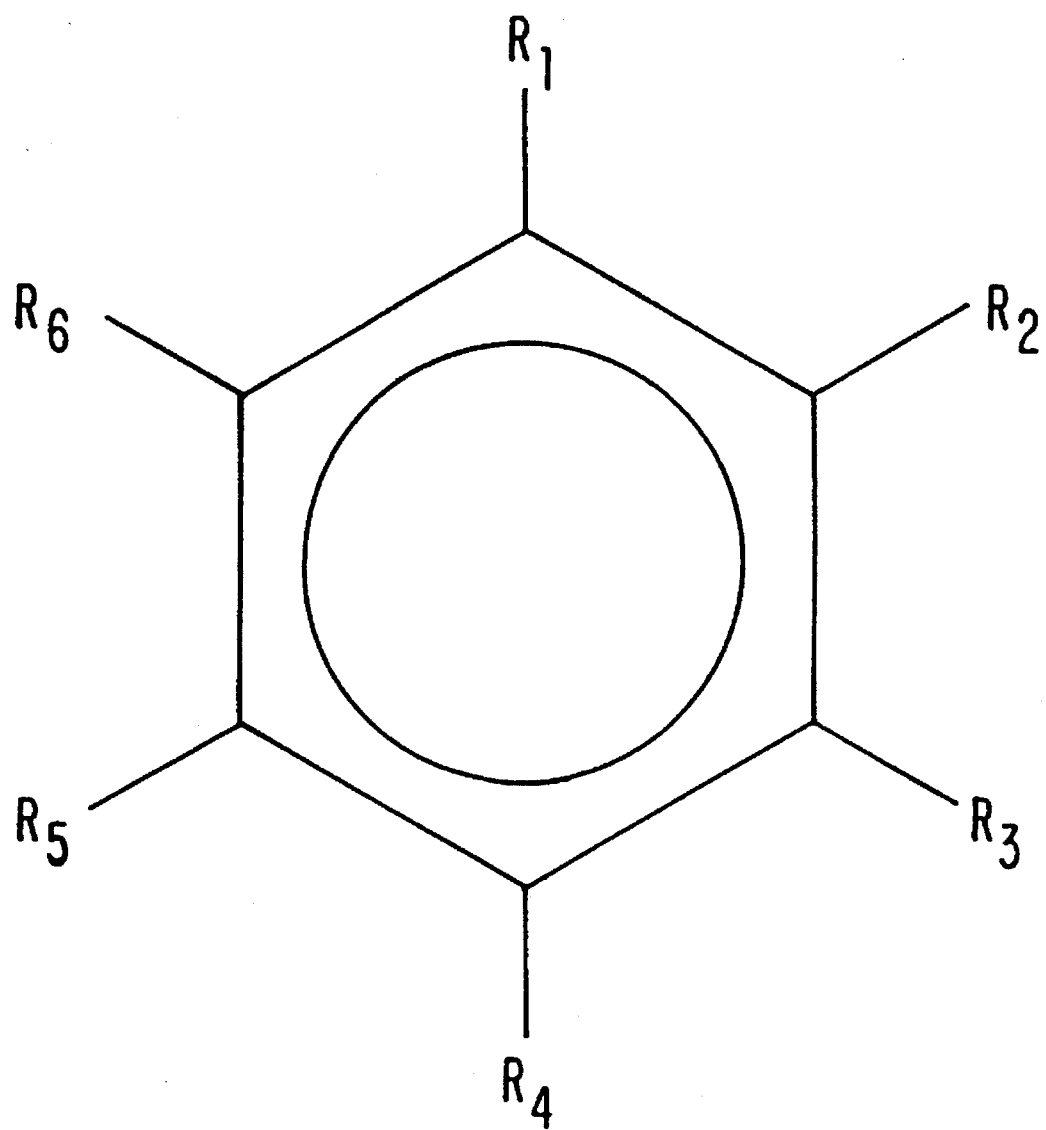
FIG. 1 is a diagram of the electrolytes of the present invention.

The electrolytes of the present invention are salts of, preferably, phenyl polysulfonic acids and phenyl polyphosphonic acids of the type shown in FIG. 1 where $R_1$, $R_2$, $R_3$, $R_4$, $R_5$, and $R_6$ each are H, $SO_3X$, R'H, $R'SO_3X$, $PO_3X$, or $R'PO_3X$, where X is a cation (such as an alkali or alkaline earth metal ion) and R' is an aliphatic chain or aromatic ring system that may or may not be fused to the parent phenyl ring structure. In liquid and solid polymer electrolyte applications, the preferred electrolyte salts are the following lithium salts: $R_1$, $R_3$, and $R_5$ are H, and $R_2$, $R_4$, and $R_6$ are $SO_3Li$ or $PO_3Li$.

Figure 2:
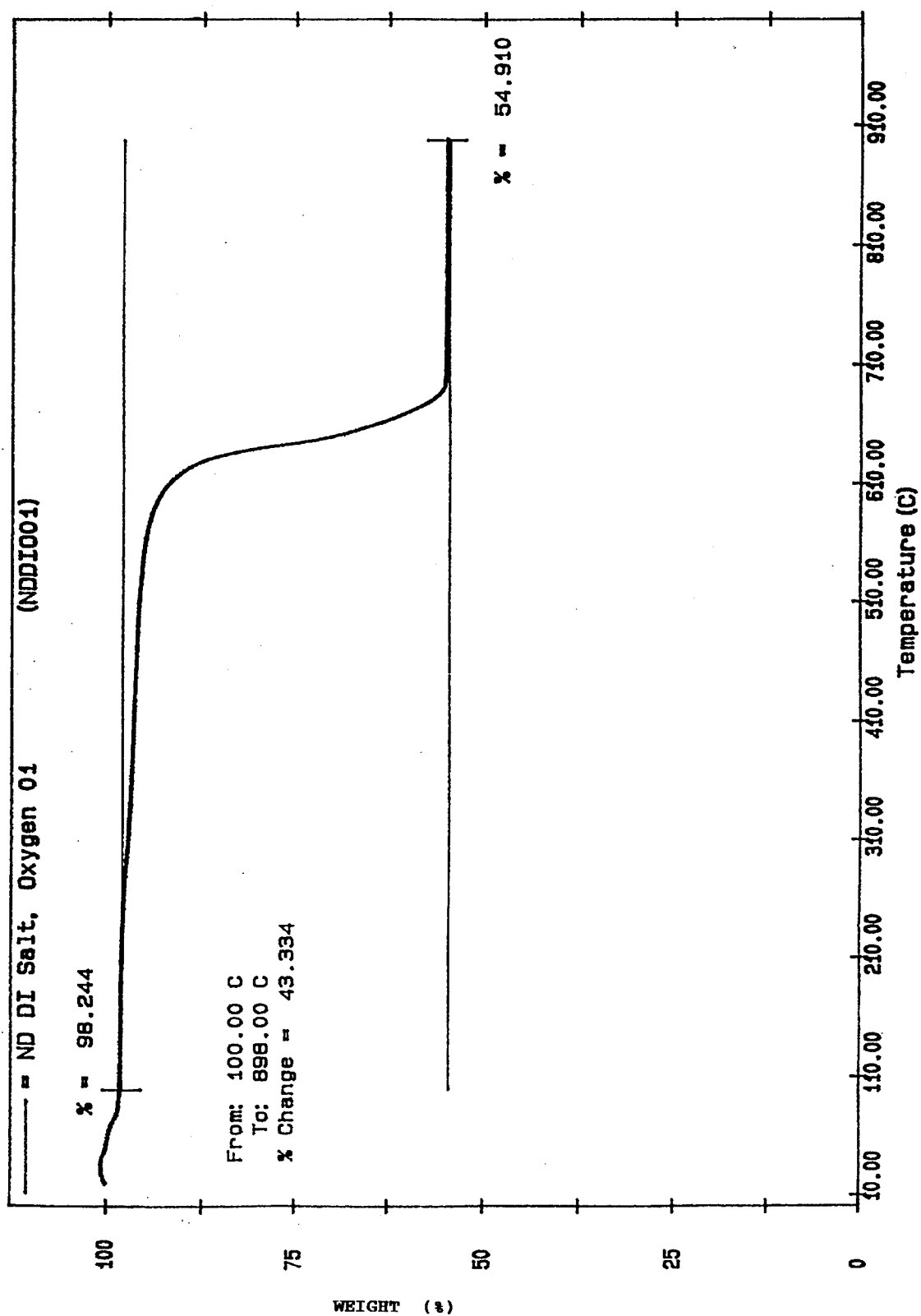
FIG. 2 is a graph of thermal gravimetric analysis data carried out in an oxygen atmosphere for a salt of the present invention where $R_1$, $R_3$, and $R_5$ are $SO_3Na$ or $SO_3Li$, and $R_2$, $R_4$, and $R_6$ are H.

The electrolytes of the present invention exhibit many useful characteristics. They display a high degree of thermal stability, and can be heated to well over 350° C. before showing signs of decomposition, even in an oxygen atmosphere. This is readily seen upon examination of the thermal gravimetric analysis data shown in FIG. 2.

The present invention is of a nonaqueous liquid electrolyte system derived from the salts of the invention in which the conductance is mainly derived from the cation. The invention is further of a polymeric system derived from the salts of the invention in which the charged species is immobilized on the polymer chain, and stearic and other factors result in reduced mobility of the counter ion, thereby resulting in single ion conduction.

Industrial Applicability:

The invention is further illustrated by the following non-limiting examples.

EXAMPLE 1

Liquid electrolytes were prepared by dissolving lithium salts of 1,3,5-trisulfonic acid in a mixture of ethylene carbonate and propylene carbonate and 12-crown-4 ether. The room temperature conductivity of these solutions was found to be greater than $4 \times 10^{-3}$ S/cm. The cyclic voltammetric studies indicated the electrolyte solutions are stable between 4.8 V and 0.5 V versus lithium reference.

EXAMPLE 2

A solid polymer electrolyte was prepared by dissolving the lithium salt of 1,3,5-trisulfonic acid in a mixture of ethylene carbonate, propylene carbonate, 12-crown-4 ether, and poly(vinylidene fluoride), and casting a thin film from this mixture. The resultant room temperature conductivities were greater than $1 \times 10^{-5}$ S/cm.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A power source comprising: a solid polymer and an electrolyte salt comprising a parent phenyl ring with bonds outside said parent phenyl ring to $R_1$, $R_2$, $R_3$, $R_4$, $R_5$, and $R_6$, where $R_1$, $R_2$, $R_3$, $R_4$, $R_5$, and $R_6$ each comprise a member selected from the group consisting of H, $SO_3X$, R'H, $R'SO_3X$, $PO_3X$, and $R'PO_3X$, where X comprises a cation and R' comprises an aliphatic chain, an aromatic ring system, or a combination of an aliphatic chain and an aromatic ring system.

2. The power source of claim 1 wherein X comprises an alkali or alkaline earth metal cation.

3. The power source of claim 2 wherein X comprises a lithium ion.

4. A method for providing power, the method comprising the steps of:
   a) providing a solid polymer; and
   b) adding to the solid polymer an electrolyte salt comprising a parent phenyl ring with bonds outside the parent phenyl ring to $R_1$, $R_2$, $R_3$, $R_4$, $R_5$, and $R_6$, where $R_1$, $R_2$, $R_3$, $R_4$, $R_5$, and $R_6$ each comprise a member selected from the group consisting of H, $SO_3X$, R'H, $R'SO_3X$, $PO_3X$, and $R'PO_3X$, where X comprises a cation and R' comprises an aliphatic chain, an aromatic ring system, or a combination of an aliphatic chain and an aromatic ring system.

5. The method of claim 4 wherein X comprises an alkali or alkaline earth metal cation.

6. The method of claim 5 wherein X comprises a lithium ion.

7. A power source comprising: a liquid and an electrolyte salt comprising a parent phenyl ring with bonds outside said parent phenyl ring to $R_1$, $R_2$, $R_3$, $R_4$, $R_5$, and $R_6$, where $R_1$, $R_2$, $R_3$, $R_4$, $R_5$, and $R_6$ each comprise a member selected from the group consisting of H, $SO_3X$, R'H, $R'SO_3X$, $PO_3X$, and $R'PO_3X$, where X comprises a cation and R' comprises an aliphatic chain, an aromatic ring system, or a combination of an aliphatic chain and an aromatic ring system.

8. The power source of claim 7 wherein X comprises an alkali or alkaline earth metal cation.

9. The power source of claim 8 wherein X comprises a lithium ion.

10. A method for providing power, the method comprising the steps of:
    a) providing a liquid; and
    b) adding to the liquid an electrolyte salt comprising a parent phenyl ring with bonds outside the parent phenyl ring to $R_1$, $R_2$, $R_3$, $R_4$, $R_5$, and $R_6$, where $R_1$, $R_2$, $R_4$, $R_5$, and $R_6$ each comprise a member selected from the group consisting of H, $SO_3X$, R'H, $R'SO_3X$, $PO_3X$, and $R'PO_3X$, where X comprises a cation and R' comprises an aliphatic chain, an aromatic ring system, or a combination of an aliphatic chain and an aromatic ring system.

11. The method of claim 10 wherein X comprises an alkali or alkaline earth metal cation.

12. The method of claim 11 wherein X comprises a lithium ion.

\* \* \* \* \*